No. 704,112. Patented July 8, 1902.
T. D. ROBINSON.
TYPE WRITING MACHINE.
(Application filed Jan. 25, 1902.)
(No Model.)

Witnesses.
Charles Selkirk
Chas R. Selkirk

Theodore D. Robinson,
Inventor.
by R W Hardie
Attorney

UNITED STATES PATENT OFFICE.

THEODORE D. ROBINSON, OF ALBANY, NEW YORK.

TYPE-WRITING MACHINE.

SPECIFICATION forming part of Letters Patent No. 704,112, dated July 8, 1902.

Application filed January 25, 1902. Serial No. 91,176. (No model.)

*To all whom it may concern:*

Be it known that I, THEODORE D. ROBINSON, a citizen of the United States, residing at Albany, in the county of Albany and State of New York, have invented certain new and useful Improvements in Type-Writing Machines; and I do hereby declare the following to be a full, clear, and exact description of the invention, such as will enable others skilled in the art to which it appertains to make and use the same.

My invention relates to type-writing machines, and has for its object to provide means for distinguishing the different letters or characters of such a machine by means of the hearing of the operator. This I accomplish by the means illustrated in the accompanying drawings, in which—

Figure 1:
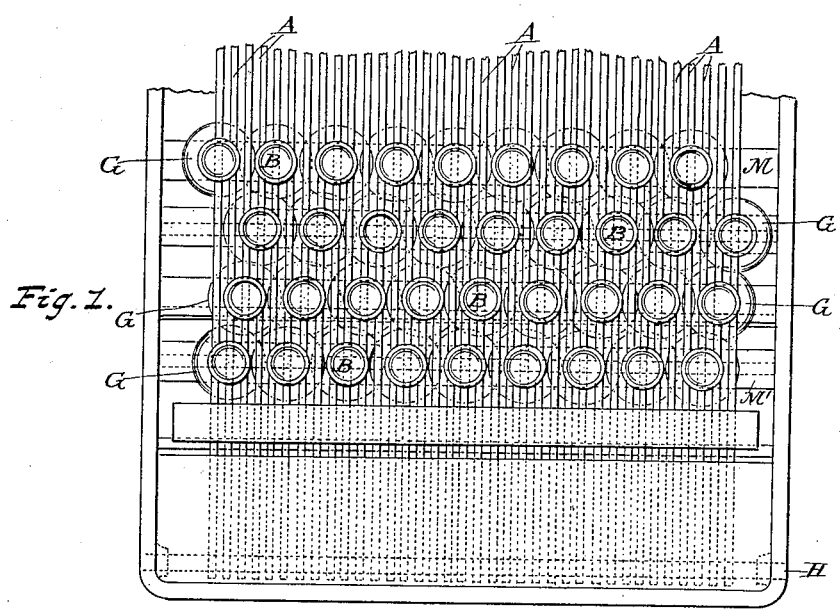
Figure 2:
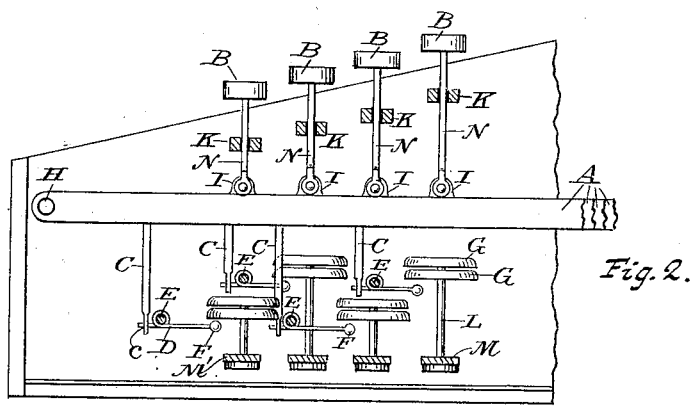
Figure 3:
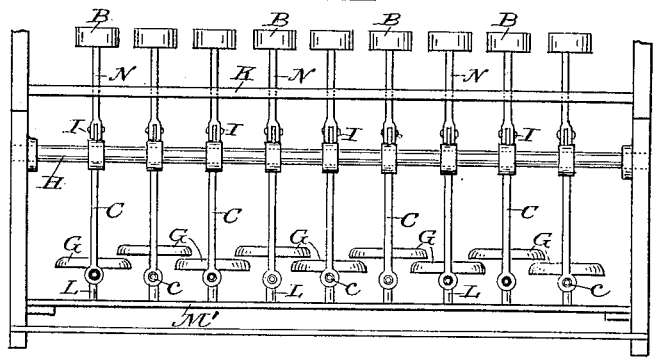

Figure 1 is a plan view, partly in section, of a keyboard of a type-writing machine embodying my invention. Fig. 2 is a side elevation of the end series of finger-keys, type-operating bars, sounding and striking mechanism of such keyboard shown in Fig. 1. Fig. 3 is a front elevation of the forward row of finger-keys, striking and sounding mechanism, together with the corresponding operating-bars and supporting-rod shown in Fig. 1.

As illustrated in the drawings, A represents a series of a well-known form of operating-levers pivoted at their forward ends to a transverse bar H and adapted to be connected with type-bars. Finger-keys B are connected with said operating-levers A by means of a pivoted or hinged joint I, and said bars pass through guide-plates K, which hold the stems N of said finger-keys in proper vertical position. Each of said operating-levers A is provided with an arm or stem C, having an aperture c, which engages freely with one end of the levers D. The levers D are pivotally mounted on transverse bars E, and the free ends of said levers are provided with hammers F, arranged in close proximity to bells G, which are shown supported on vertical stems L, secured to a base which preferably consists of transverse bars M. When pressure is applied to the finger-keys B by the operator, the levers A, which operate the type-bars, and the ends of the pivoted levers D, which engage the stems C of said operating-bars, are depressed, and the hammers F of said lever come in contact with the sounding-bells G. The pivoted levers D are preferably made resilient, so that the downward movement of the operating-levers A may continue to a limited extent even after the hammers F of the levers D come in contact with the bells G. The bells G are so constructed that each bell has a distinct and individual sound different from that of all the other bells, or a series of bells may have the same distinct sound which differs from the sound of another series of bells. This is accomplished by any of the well-known means now employed for such purpose, such as making the bells of different sizes or shapes, or by bringing the hammers of the levers D in contact with different portions of the bell, or by the use of other sounding devices which may be substituted for bells, if desired. Such bells or sounding devices may be arranged in the same horizontal plane, if desired; but I prefer to arrange them in transverse rows or sets in which the alternate bells of one row or set are in a different horizontal plane from that of the other bells of said transverse row or set for the purpose of permitting bells of larger size to be used than could be employed if arranged in the same horizontal plane. I prefer, moreover, to arrange all of the bells of an alternate transverse row or set in a different plane from that of its adjacent transverse row for the same reason. Thus the bells supported on the base M are arranged on a higher plane than those supported on the base M'. By means of such construction the finger-keys of a type-writing machine and the type-bars may be operated without the use of the sight of the operator, and the operator can determine by the sound given out by striking a particular finger-key which type has been used.

I do not desire to be limited to the particular mechanism shown for carrying out my invention, which contemplates, broadly, the use of any kind of sounding devices and connecting mechanism, in connection with the finger-keys and type-operating bars of a type-writing machine, whereby a touch of a particular key produces a movement of a particular type-operating bar and type and a predetermined sound characteristic of said type attached to or operated by said bar.

What I claim as new, and desire to secure by Letters Patent, is—

1. In a type-writing machine, the combination with a series of finger-keys, of a series of type-operating bars, a series of sounding devices, and a series of striking devices adapted to produce predetermined sounds by the operation of said finger-keys and type-operating bars, substantially as shown and described.

2. In a type-writing machine, the combination with a series of finger-keys, of a series of type-operating bars, a series of striking and sounding devices each sounding device having a distinct relation with a particular type so that each key will produce a predetermined sound for each character, substantially as shown and described.

3. In a type-writing machine, the combination with a series of finger-keys, of a series of type-operating bars, and a series of striking and sounding devices adapted to produce a predetermined sound distinguishing each character or type operated by said bars, substantially as shown and described.

4. In a type-writing machine, the combination with a series of finger-keys, of a series of type-operating bars, a series of sounding devices, and a series of pivoted levers connected with said operating-bars and adapted to strike said sounding devices, substantially as shown and described.

5. In a type-writing machine, the combination with a series of finger-keys, of a series of type-operating bars, a series of sounding devices arranged in sets in varying horizontal planes, striking devices connected with said operating-bars and adapted to come in contact with said sounding devices, substantially as shown and described.

In testimony whereof I affix my signature in presence of two witnesses.

THEODORE D. ROBINSON.

Witnesses:
ROBERT W. HARDIE,
MARY P. ADAMS.